Figure 6:
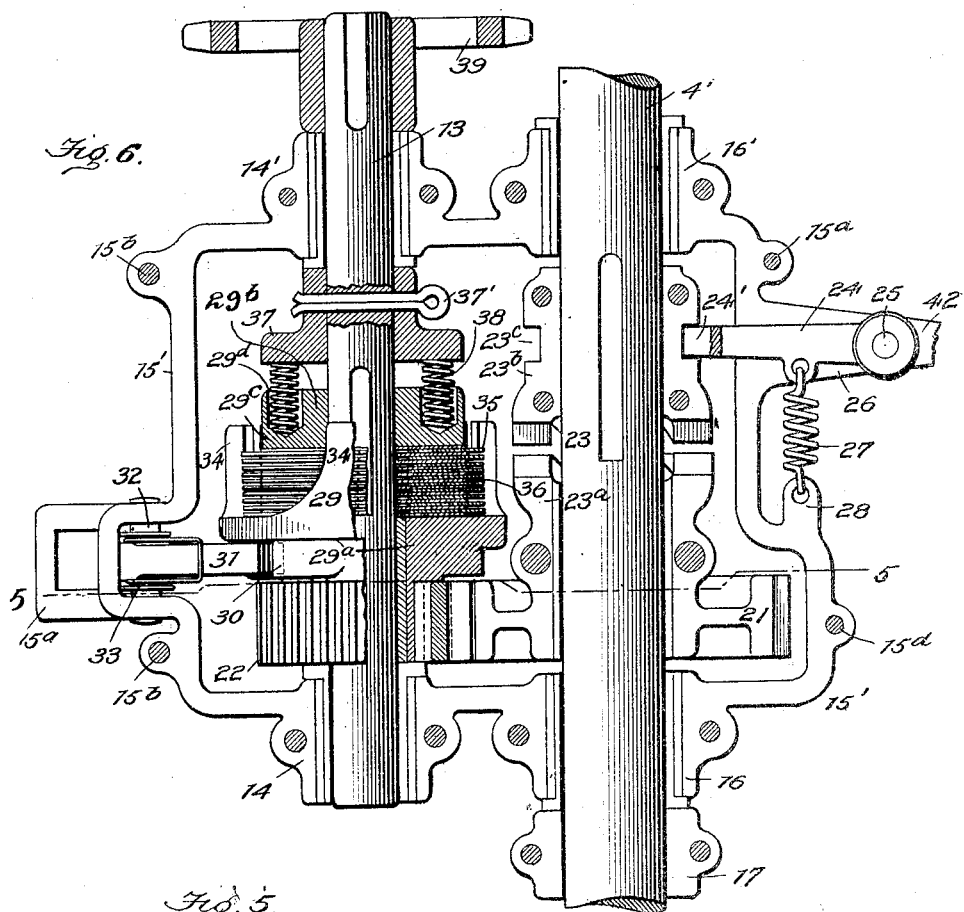

F. L. SESSIONS.
CABLE REELING MECHANISM FOR ELECTRIC TRACTION SYSTEMS.
APPLICATION FILED FEB. 20, 1904. RENEWED FEB. 23, 1909.
1,112,331.
Patented Sept. 29, 1914.
4 SHEETS—SHEET 1.
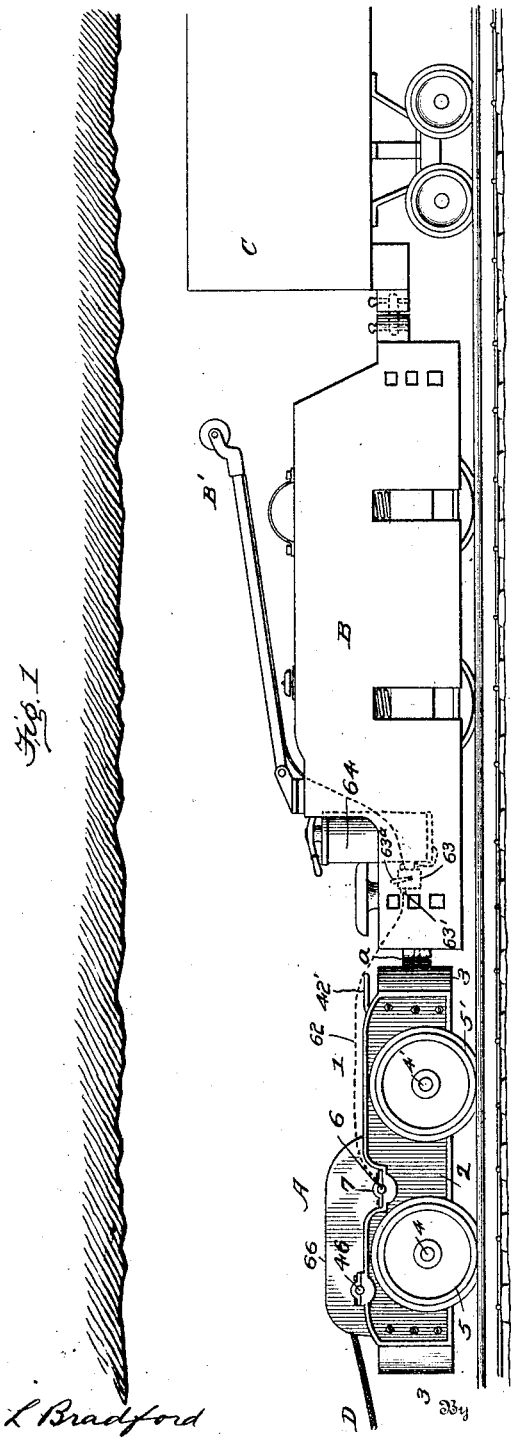

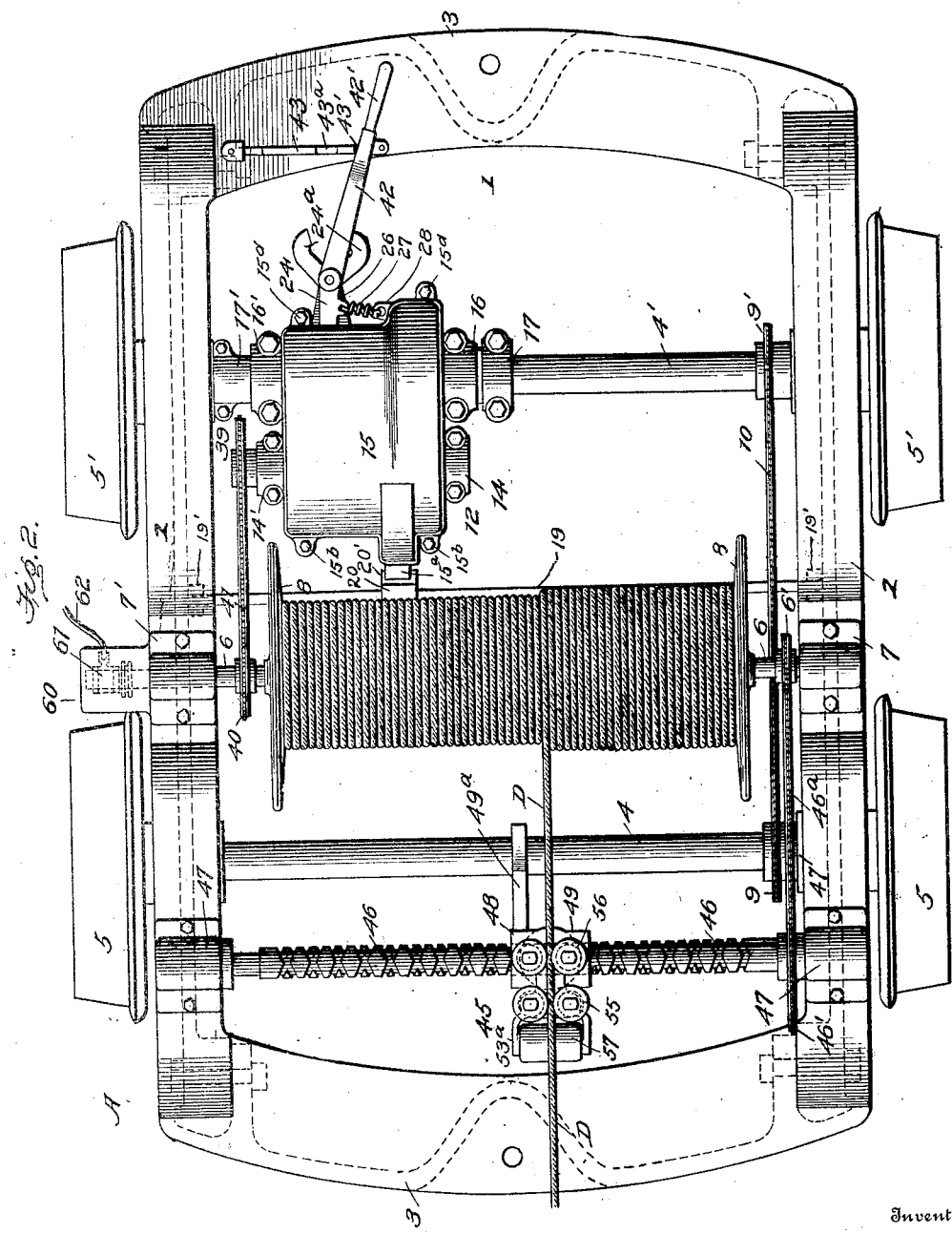

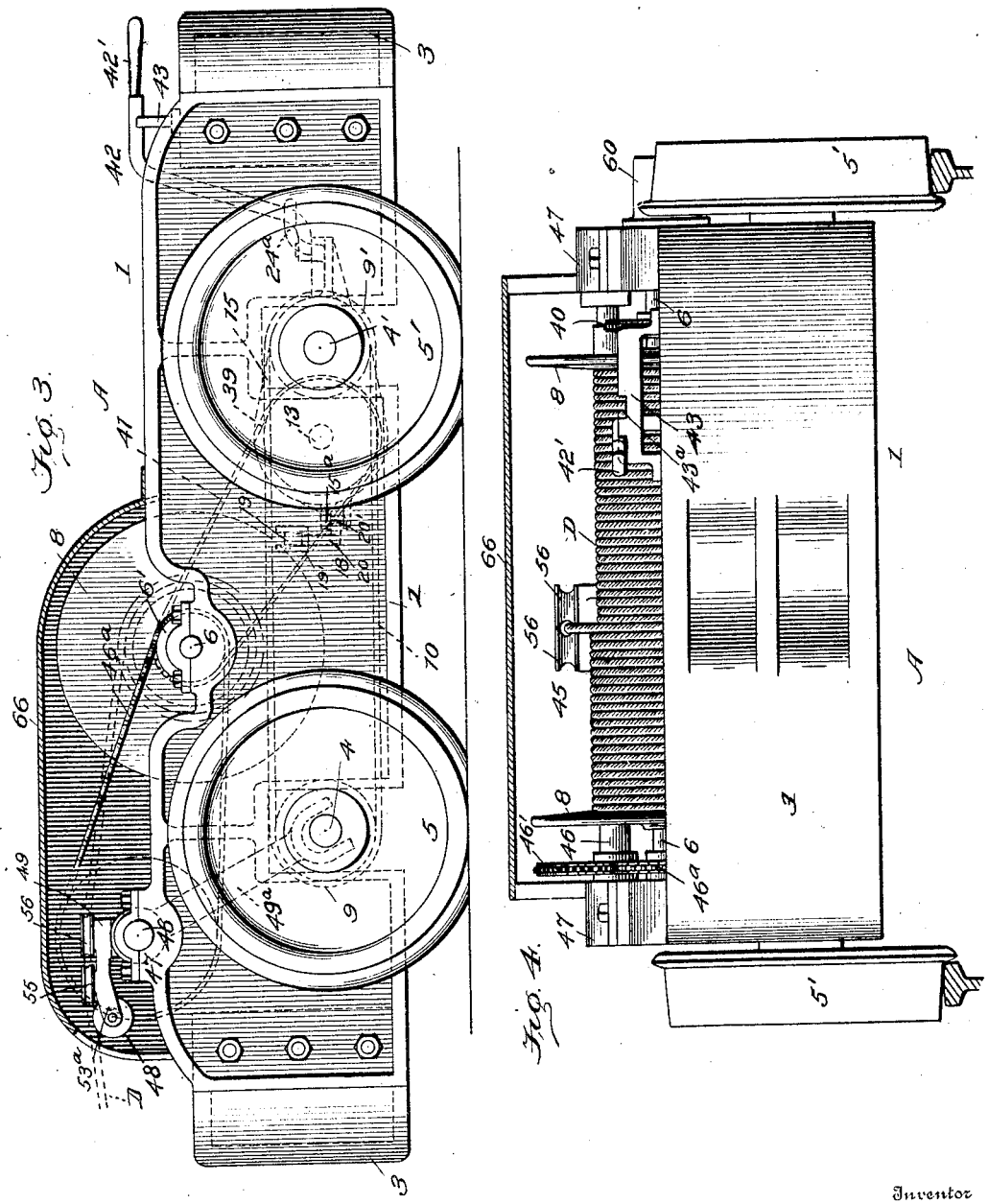

F. L. SESSIONS.
CABLE REELING MECHANISM FOR ELECTRIC TRACTION SYSTEMS.
APPLICATION FILED FEB. 20, 1904. RENEWED FEB. 23, 1909.

1,112,331.

Patented Sept. 29, 1914.

4 SHEETS—SHEET 4.

UNITED STATES PATENT OFFICE.

FRANK L. SESSIONS, OF COLUMBUS, OHIO, ASSIGNOR, BY MESNE ASSIGNMENTS, TO THE JEFFREY MANUFACTURING COMPANY, A CORPORATION OF OHIO.

CABLE-REELING MECHANISM FOR ELECTRIC TRACTION SYSTEMS.

1,112,331.   Specification of Letters Patent.   Patented Sept. 29, 1914.

Application filed February 20, 1904, Serial No. 194,590. Renewed February 23, 1909. Serial No. 479,515.

*To all whom it may concern:*

Be it known that I, FRANK L. SESSIONS, a citizen of the United States, residing at Columbus, in the county of Franklin and State of Ohio, have invented certain new and useful Improvements in Cable-Reeling Mechanism for Electric Traction Systems, of which the following is a specification, reference being had therein to the accompanying drawing.

This invention relates to mechanism for controlling the operation of a cable-winding reel for an electric traction system. It is particularly adapted for use in connection with electric haulage locomotives for mines. The advantages of using a cable reel on a mine locomotive in order to enable the locomotive to traverse parts of the mine which are not electrically equipped, are now well known and numerous mechanisms have been devised for operating cable reels of this type. With electric locomotives so equipped with cable reels operated from a moving part of the locomotive, numerous difficulties have been experienced in the use of the machines, owing to the fact that it has been impossible to insure that the reel will be operated to wind up the cable under all the different conditions to which the locomotive may be subjected. The greatest difficulty experienced has been due to the slippage of the track wheels of the locomotive on the rails. When slippage occurs, and the locomotive is running toward the cable, the winding of the reel stops during the time of the slipping and there is great danger of the locomotive running over the cable and mutilating it. It is evident that in order to insure against such destruction of the cable, that no rotating part of the locomotive can be depended upon for such purposes.

In order to avoid difficulties such as those mentioned above and to provide a simple cable-reeling device which will be certain of operation under all conditions of travel of the locomotive, I have provided a truck for the cable reel which is independent of the locomotive, but which is adapted to be attached to the locomotive and to be propelled thereby. The power transmitting devices for operating the cable reel itself are arranged upon the said separate truck and are interposed between the reel thereon and the axles of the truck. The truck is made heavy enough so that the traction of its wheels upon the rails will insure positive action of the reel under any condition of the rail.

Figure 5:
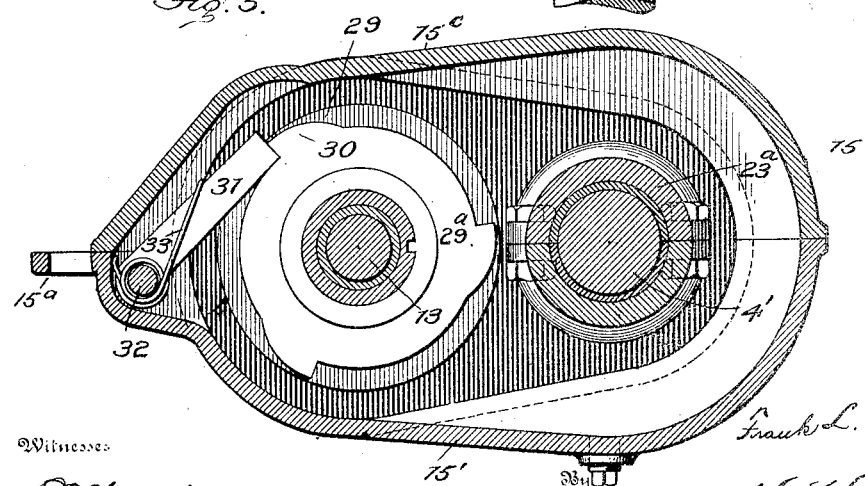

Figure 1 is a section through a mine entry showing in side elevation a cable-reeling truck embodying my invention connected with an electric haulage locomotive. Fig. 2 is a plan view of a cable reeling truck embodying my improvements, the cover of the truck being removed. Fig. 3 is an enlarged side elevation of the truck with the cover shown in section. Fig. 4 is a front elevation of the truck, the cover being shown in section. Fig. 5 is a section on the line 5—5, Fig. 6. Fig. 6 is a view partly in plan and partly in section of the clutching and driving mechanism for the reel.

In the drawings A represents as an entirety a cable reeling truck embodying my invention, coupled at *a* to an electric traction locomotive B, which is shown drawing a coal car C.

D indicates as an entirety the flexible cable which is adapted to be paid out from and wound up upon the cable reeling truck.

The electric locomotive may be of any kind or description which is operated by an electric motor or motors arranged thereon.

1 indicates the framework of the cable reel truck. It preferably consists of the side plates 2—2 and the end plates 3—3.

4, 4' indicate the front and rear axles of the truck to which are rigidly secured the pairs of track wheels 5—5 and 5'—5', respectively. The frame is of sufficient weight to insure that when it is pushed in one direction or the other along the tracks the tractive force between its track wheels and the rails will cause the axles 4, 4' to revolve, no matter what the condition of the rail.

6 is a transversely arranged reel shaft mounted in bearings 7, 7', secured to the side walls 2—2 of the frame.

8 is a reel or drum rigidly secured to the said shaft. This reel may be of any of the well known forms now used for similar purposes.

9, 9' are sprocket wheels rigidly secured to the axles 4, 4' respectively.

10 is a chain belt connecting the sprocket wheels 9, 9' together, and adapted to insure the simultaneous rotation of both axles so that even should the track wheels 5', 5' temporarily leave the rails, the axle 4' would be rotated by the power transmitted from the axle 4 through the chain 10.

12 indicates as an entirety the power-transmitting mechanism interposed between the axle 4' and the reel shaft 6.

13 is a counter shaft arranged between the axle 4' and the reel shaft. It is mounted in bearings 14, 14' carried by the under half of the casing or housing 15. The lower portion or section 15' of this casing 15 is supported at its rear end by bearings 16, 16', on the axle 4'.

17, 17' are collars rigidly secured to the axle 4', adjacent to the bearings 16, 16' respectively, and adapted to prevent the lateral swinging or moving of the casing 15.

The forward end of the section 15' may be supported from the framework of the truck in any well known manner so as to allow of slight rotation of the casing about the axle 4'. In the drawings this support for the front end of the casing is indicated as an entirety by 18. It comprises a transversely arranged bar 19 supported at either end on inwardly extending lugs or projections 19' on the side plates 2—2 of the frame, a downwardly extending bar 20 supported by the bar 19 and having at its lower end a hook or lateral projection 20' which is adapted to engage with the lug 15ª on the lower portion 15' of the said casing or housing. This manner of supporting the casing will permit of the necessary flexibility of mounting to compensate for the jars and vibrations which the truck receives.

21 is a gear wheel loosely mounted on the axle 4' and within the casing 15.

22 is a gear wheel loosely mounted on the shaft 13 and arranged to mesh with the wheel 21.

23 is a positive clutch interposed between the gear 21 and the axle 4'. It comprises a stationary jaw element 23ª which is secured to or formed integral with the gear wheel 21 and the movable jaw element 23ᵇ splined to the said axle. Both the elements 23ª and 23ᵇ of this clutch are preferably formed in halves separable in horizontal planes so that they may be quickly and easily assembled upon the axle 4'. The jaws of the elements of the clutch are formed so as to cause the positive rotation of the wheel 21 when the axle is rotated in one direction and to slip over each other without causing the rotation of the wheel 21 when the axle is rotated in the opposite direction.

23ᶜ is a groove in the periphery of the clutch element 23ᵇ.

24 is a lever pivoted at 25 to an arm 26 on the lower section 15' of the casing. At its inner end the lever 24 is forked as indicated at 24' and arranged to engage with the walls of the groove 23ᶜ in the clutch element 23ᵇ.

27 is a spring secured at one end to the lever 24 and at its other end to a lug 28 on the casing 15. This spring tends to normally hold the jaws of the clutch 23 in engagement with each other. At its outer end the lever arm 24 is bifurcated or forked as indicated at 24ª, the arms of this fork being bent upwardly for a purpose to be hereinafter described.

29 indicates as an entirety a friction clutch interposed between the gear 22 and the shaft 13. Preferably this friction clutch consists of an element 29ª loose upon the said shaft and having the gear 22 secured thereto and an element 29ᵇ splined to the shaft and movable longitudinally thereof. The element 29ª has secured to it or formed integral therewith a ratchet 30.

31 is a pawl pivotally mounted at 32 in the lower section 15' of the casing 15.

33 is a spring for normally holding the said pawl yieldingly in engagement with the teeth of the ratchet 30.

The friction clutch 29 is preferably of the class in which disks or plates carried by one of the elements are adapted to be forced into frictional engagement with disks carried by the other element in such manner that the frictional resistance between the surfaces of the said disks cause the elements of the clutch to revolve together.

In the drawings 34 indicate a series of laterally projecting lugs on the clutch element 29ª arranged near the circumference of the said element and slotted longitudinally.

35 are friction disks or plates upon the peripheries of which are projections which enter slots in the lugs 34 so as to insure that the disks will rotate with the clutch element 29ª.

36 are friction disks or plates arranged between the disks 35. They are keyed to the shaft 13 so as to rotate therewith. The clutch element 29ᵇ comprises the disk 29ᶜ splined to the shaft 13 and arranged adjacent to the friction disks just described and adapted to press them into engagement with each other.

37 is a collar secured in position on the shaft 13 by means of a cotter-pin 37'.

29ᵈ are sockets in the disk or plate 29ᶜ adapted to receive the springs 38 which are seated in these sockets and arranged to bear against the inner walls of the sockets and the collar 37 so as to hold the friction plates 35 and 36 normally into engagement with each other.

39 is a sprocket wheel secured to the outer end of the shaft 13.

40 is a sprocket wheel secured to the reel shaft 6 and 41 is a chain belt connecting the sprocket wheels 39 and 40 together.

15ᶜ indicates the uper portion or section of the housing or casing 15. It is secured by bolts 15$^b$, 15$^a$, to the lower portion 15' of the housing and is entirely independent and separate from the bearings 14, 14' and 16, 16' carried by the said lower portion 15' of the housing, so that this upper section or cover may be removed without affecting or dismantling the said bearings. Preferably the chamber within the lower section of the casing 15 is filled with oil and all the movable parts within the casing operate through this oil so as to insure that the said parts will all be properly and thoroughly lubricated.

At times it is desirable that the elements of the positive clutch 23 on the axle 4' should be held out of engagement with each other. To this end I provide a lever 42 likewise pivoted at 25 on the arm 26 carried by the casing 15 and arranged to engage with the upwardly bent arms 24$^a$ of the clutch-controlling lever 24. This lever 42 extends upwardly and then rearwardly over the end wall of the truck frame so as to be within easy reaching distance of the operator on the electric locomotive.

43 is a locking rest or rack secured to the rear end wall 3 of the truck. It is notched at 43' to receive the lever 42 and hold it against lateral vibration until it is released by the operator. The lever 42 holds the element 23$^b$ of the positive clutch out of engagement with the element 23$^a$. It will be noted that when the elements of this clutch are in engagement and the truck is running rearward, that the element 23$^b$ will be vibrated continuously and that the lever 42 may be locked in the notch 43$^a$ in the rest 43, in which position it will not be engaged by the arms 24$^a$ of the said lever 24. These arms serve to permit the elements of the clutch to be held either out of engagement or in engagement with each other according to the direction in which the operator swings the lever 42.

45 indicates as an entirety the mechanism for guiding the cable D onto and off of the reel.

46 is a double threaded rod mounted in bearings 47—47 carried by the side walls 2—2 of the frame.

48 indicates the traveler or carriage for directing the cable relative to the reel.

49 is the sleeve of said carriage mounted on the shaft 46.

49$^a$ is an arm extending downwardly from the sleeve 49 and having its lower end bifurcated to fit over the axle 4. This arm 49$^a$ prevents the sleeve 49 from rotating about the axis of the shaft 46 and insures that the traveler or carriage will always operate in the proper horizontal plane.

55 and 56 indicate pairs of rollers pivotally mounted on the carriage 48 on vertical axes and adapted to receive and guide the cable between the rollers of each pair.

53$^a$ are arms extending forwardly and downwardly from the carriage 48.

57 is a transversely arranged roller pivotally mounted in bearings in the arms 53$^a$ and arranged to support and guide the cable between the first pair of rolls 55.

The shaft 46 is preferably driven from the reel shaft 6 so as to insure that the traveler 48 will be operated simultaneously with the reel.

46' is a sprocket wheel secured to the shaft 46.

6' is a sprocket wheel secured to the shaft 6, and 46$^a$ is a chain belt connecting the sprocket wheels 6' and 46' together.

The end of the cable D, which is carried by the cable reel truck, extends laterally from the reel 8 and is connected to an electrical terminal 60 supported at one side of the frame.

61 is a collector or brush for taking the current from the terminal 60.

62 is a conductor leading from the collector or brush 61 to a switch 63 on the electric locomotive B. This switch is preferably of the single pole double throw type. When the cable-reel truck is coupled up to the locomotive B the free end of the conductor 62 is secured to the binding post 63' of the switch 63, and the switch-lever 63$^a$ is swung so as to complete the circuit between the terminal 60 on the cable-reel truck and the controller 64 on the locomotive. When the switch lever 63$^a$ is thrown in the opposite direction the connections are such that the controller will receive current from the trolley line through the trolley B'.

When the electrical circuit is not completed through the rails but through a second wire carried by the cable reel, this second wire is preferably grounded to the frame of the cable-reel truck and the return circuit from the motors on the electric locomotive is completed through the frame of the locomotive and the frame of the cable-reel truck, the coupling device between them conducting the current from one to the other. However the electrical connections from the two wires of the cable to the locomotive motor may be made in any well known manner.

66 is a cover or hood secured on the frame of the cable-reeling truck and adapted to protect the reel and the cable-guiding devices from dirt, dust, and the like.

In cable-reeling devices for electric traction work, it is desirable that the cable should be paid out uniformly and evenly as the reeling device moves away from the terminal connection for the cable. If the reel during this operation is permitted to run freely, the cable will be paid out too rapidly and any jerks or sudden strains will tend to cause a great unevenness in the paying out and furthermore there will be a possibility of back-lashing of the cable. By controlling the operation of the reel during the paying out of the cable through a friction clutch, such as the one provided at 29, I insure the perfect distribution of the cable as it unwinds from the reel. The elements of the clutch at 29, while normally held in engagement by the springs 38, may rotate relative to each other. When the reel is paying out cable the pawl 31 engages with one of the teeth on the ratchet 30 and prevents the rotation of the clutch element 29ª so that the rotation of the cable reel is accomplished against the frictional resistance between the series of plates 35 and 36. Under these circumstances it is certain that the cable will be held taut during this operation. It is also desirable in mechanisms of this class to have the reel rotate at a speed which will cause the winding up of the cable slightly faster than the travel of the mechanism which carries the reel so as to prevent running over and mutilating the cable. However, as it is necessary to wind more than one layer of the cable on the reel in most instances, some means for compensating for the increased speed of winding occasioned by the increased diameter of the circumference on which the cable is wound should be provided. Unless such a compensating device is made use of, there will be a danger of reeling up the cable so rapidly that the cable will be drawn taut and subjected to a tension which would either break it or pull out its connections with its terminal plug.

My invention contemplates the use of such a device for compensating for the increased speed of winding of the cable as the layers on the cable reel increase. The friction clutch at 29 serves the double purpose of acting as a brake during the unreeling of the cable and as a compensating device during the reeling thereof, so that if the tension on the cable becomes too great during the said reeling, the series of plates 35 and 36 will slip relative to each other and prevent the cable being subjected to too great tension.

The operation of my cable-reel device is as follows: When it is desired to operate an electric locomotive in a portion of a mine which is not electrically equipped with trolley wire or stationary conductor, the truck A is coupled to one end of the locomotive, preferably the one at which the operator sits, the conductor 62 leading from the collector 61 on the cable-reel truck is inserted in the binding post 63′ of the switch 63 on the locomotive B. The free end of the cable D is connected into circuit with the trolley line and return circuit for the current from any desired point in the mine, is completed in any well known manner. Where the mine is tracked throughout with iron rails a cable with one electric conductor therein is usually used. Where the locomotive must travel over wooden rails or rails not forming a return circuit for the current in certain portions of the mine, a cable having two electric conductors is used, one for supplying to and the other for returning the current from the locomotive. After the truck has been coupled up to the locomotive the operator throws the switch 63 so as to complete the circuit from the collector 61 to the controller 64 on the locomotive. Current may then be switched to the motors on the locomotive so as to cause it to move away from the terminal to which the free end of the cable D has been connected. As the locomotive so moves away it draws with it the cable-reel truck. The tension on the cable D tends to unwind the cable from the reel and the speed of rotation of the reel is governed or controlled by the friction plates 35, 36 of the friction clutch 29, the plates 35 being held stationary because of the engagement of the pawl 31 with one of the teeth of the ratchet 30. During this paying out of the cable, the operator, if he so desires, may shift the lever 42 so as to throw the elements of the clutch 23 out of engagement with each other and stop the vibrating of the positive clutch element 23ᵇ. When it is desired to have the locomotive travel in the opposite direction, during which operation the cable must be wound up on the reel, the operator should see that the lever 42 is shifted to permit of the engagement of the jaws of the clutch 23, unless he has not disconnected the elements of the clutch 23. The forward motion of the locomotive will cause the forward motion of the cable-reeling truck. The rotation of the axle 4′ will be transmitted by the clutch 23 through the gear 21 to the gear 22, and through the friction clutch 29 to the shaft 13 and sprocket wheel 39 thereon so as to cause the rotation of the cable reel and the winding up of the cable thereon. If the speed of rotation of the reel is such as to subject the cable D to a tension greater than the frictional resistance between the plates 35, 36 of the friction clutch 29, the said plates will slip relative to each other, and prevent the tension on the cable becoming too great. During the operation of the cable-reel in either direction, the traveler 48 moves back and forth along the shaft 46 and guides the cable as it is wound upon or unwound from the reel.

One of the particular advantages of a reeling mechanism of my invention is due to the fact that it may be employed with any type of electric traction locomotive now in use. This is of particular importance in view of the fact that it is always difficult, if not impossible, to arrange a cable-reeling mechanism on a locomotive which was not originally constructed for the purpose.

The only alterations or additions necessary in order to adapt a locomotive for use in connection with one of my cable-reel trucks is to provide upon it a switch and electrical connections between the said switch and the controller on the locomotive arranged to connect the controller either through the trolley mechanism on the car or through the cable-reeling mechanism on the truck. While in the drawings I have shown the truck which carries the cable-reeling mechanism formed separately and independently of the locomotive by which it is to be propelled, it will be understood that my invention broadly contemplates the use of any operating mechanism for a cable reel for use in connection with such a locomotive, which operating mechanism is driven by a wheel or wheels adapted to be propelled by the locomotive and which are independent of the locomotive axles and support a sufficient weight to insure that the axle from which power is transmitted to drive the cable-reel will be rotated irrespective of the conditions of the rail or surface upon which the wheel is operating and irrespective of whether the locomotive wheels are slipping or rolling on their supporting rails.

The friction retarding means shown and described herein has not been claimed broadly, such means having been the subject of claims in my application Serial No. 196,077, filed March 1, 1904. The current collecting mechanism shown herein is also claimed in the said application, Serial No. 196,077.

What I claim is:—

1. In a cable reeling mechanism for an electric locomotive, the combination with a cable reel, track wheels and a rotating axle secured to the track wheels, of a train of power transmitting devices interposed between the reel and the axle and comprising a friction clutch, the elements of which are held in yielding engagement with each other, a ratchet wheel carried by the clutch element operatively farther from the reel, and a pawl adapted to engage the teeth of the ratchet and prevent the rotation of the last said clutch element in one direction.

2. In an electric traction system, the combination of a separate and independent wheeled truck adapted to be detachably connected with an electric locomotive, an electric cable reel suitably mounted upon the truck, power transmitting mechanism for controlling the operation of said reel in the direction to wind up the cable thereon including a uni-directional drive positive clutch connected to the track wheels, a friction clutch the elements of which are normally held in forced contact with each other, and means for holding the element of the friction clutch which is operatively farther from the reel against rotation in one direction.

3. In a cable reeling mechanism for an electric locomotive, the combination with a cable reel adapted to wind up and pay out a cable, of mechanism for controlling the rotation of the reel comprising a rotating shaft and a train of power transmitting devices interposed between the shaft and the reel and comprising a uni-directional drive positive clutch and a friction clutch, one element of which can rotate in the direction to turn the reel to wind up the cable and is held from turning in the opposite direction, whereby the friction between the clutch elements operates to oppose the rotation of the reel in cable paying out direction.

4. In a cable reeling mechanism for an electric locomotive, the combination with a cable reel adapted to wind up and pay out a cable, of mechanism for controlling the rotation of the reel including a pair of friction elements normally held in forced contact with each other and arranged to rotate together in one direction to turn the reel to wind up the cable, and a clutch in the train of power transmitting devices connecting one of said friction elements with the source of power, means for holding the last mentioned friction element against rotation in the direction to turn the reel to pay off the cable, and means for throwing the said clutch into or out of operation.

5. In an electric locomotive cable reeling mechanism, the combination of a cable reel adapted to wind up and pay out a cable, of mechanism for controlling the rotation of the reel comprising a pair of power transmitting friction elements normally held in forced engagement with each other, a uni-directional clutch for transmitting power to the element operatively farther from the reel, and a means for locking the last said element against rotation in the direction opposite to that in which it is rotated by the clutch.

6. In an electric traction system, the combination of a separate and independent truck adapted to be detachably connected with an electric locomotive, the truck being provided with axles and track wheels, a cable reel suitably mounted upon the truck, an electric cable connected to be wound upon or unwound from the reel, a power connection between one axle and the reel comprising a friction clutch and a uni-directional drive clutch between the axle and the friction clutch, means for holding the element of the friction clutch which is connected with the uni-directional clutch against rotation in the direction opposite to that in which it is driven by the uni-directional clutch, whereby rotation of the reel in one direction is resisted by the friction clutch, and means positioned to be controlled by an operator on the locomotive to which the truck is connected for throwing the uni-directional drive clutch into and out of operation.

7. In an electric locomotive cable reeling mechanism, the combination of a truck adapted to be detachably connected with a locomotive to be moved thereby, the truck being provided with axles and track wheels, a reel on the truck, an electric conductor cable connected to be wound upon and unwound from the reel, a uni-directional drive clutch having its driving element connected with one axle, a friction clutch between the uni-directional clutch and the reel, and automatic means for holding the element of the friction clutch nearer the uni-directional clutch against rotation in the direction opposite to that in which it is driven by the uni-directional clutch, whereby the friction between the clutch elements operates to oppose the rotation of the clutch in cable unwinding direction.

8. In an electric locomotive cable reeling mechanism, the combination of a truck adapted to be detachably connected with a locomotive to be moved thereby, the truck being provided with axles and track wheels, a reel on the truck, an electric conductor cable connected to be wound upon and unwound from the reel, a uni-directional drive clutch having one element connected to one axle, a friction clutch having one element connected to the other element of the uni-directional clutch, and the other element connected to the reel, means for automatically holding the first element of the friction clutch against rotation in the direction opposite to that in which it is driven by the uni-directional clutch, and a device within the control of an operator on the locomotive with which the truck is connected for throwing the uni-directional clutch into and out of operation.

9. In a cable reeling mechanism for an electric locomotive, the combination of axles, track wheels secured thereto, a frame mounted on the axles, a reel shaft mounted on the frame, a cable reel carried on the shaft, a counter-shaft arranged between one of the axles and the reel shaft, power transmitting mechanism between the counter shaft and the reel shaft, a train of power-transmitting mechanism between the said axle and the counter-shaft comprising a manually controllable positive clutch and a friction clutch, the elements of the friction clutch being held yieldingly in engagement with each other, and means for preventing the element operatively nearer the axle from rotation in the direction corresponding to rotation of the reel in the cable unwinding direction.

10. In a cable reeling mechanism for an electric locomotive, the combination of axles, track wheels secured to the axles, a frame mounted on the axles, a reel shaft mounted on the frame, a cable reel carried on the shaft, a counter-shaft arranged between one of the axles and the reel shaft, power transmitting mechanism between the counter-shaft and the reel shaft, a train of power transmitting mechanism between the said axle and the counter-shaft comprising a uni-directional drive clutch and a friction clutch, the elements of the friction clutch being held yieldingly in engagement with each other, and means for preventing the element operatively nearer the axle from rotation in the direction corresponding to rotation of the reel in cable unwinding direction.

11. In an electric traction system, the combination of an independent truck provided with axles and supporting wheels and adapted to be detachably connected with an electric locomotive to be moved thereby, an electric cable reel suitably mounted upon the truck, power transmitting mechanism between one axle and the reel for controlling the operation of the reel in the direction to wind up the cable thereon, the said power transmitting mechanism being independent of all other operative parts and including a friction clutch, the elements of which are normally held in forced contact with each other, and means for throwing the said power transmitting mechanism into and out of operation.

12. In an electric traction system, the combination of an independent truck provided with axles and supporting wheels and adapted to be detachably connected with an electric locomotive to be moved thereby, an electric cable reel suitably mounted upon the truck, and power transmitting mechanism between one axle and the reel for controlling the operation of the reel in the direction to wind up the cable thereon, the said power transmitting mechanism being independent of all other operative parts and including a friction clutch, the elements of which are normally held in forced contact with each other and a positive clutch.

13. In a cable reeling mechanism for an electric locomotive, the combination with a suitably mounted electric cable reel, of a driving shaft for the reel, a counter-shaft arranged parallel to the driving shaft, power transmitting mechanism interposed between the driving shaft and the counter-shaft including a positive clutch and a friction clutch, and power transmitting mechanism connecting the countershaft with the reel.

14. In a cable reeling mechanism for an electric locomotive, the combination of axles, track wheels secured thereto, a truck frame mounted on the axles, a cable reel mounted on the frame, and a train of power transmitting devices interposed between one of the axles and the reel and comprising a positive clutch arranged on the axle, a countershaft between the axle and the reel, and a friction clutch arranged on the countershaft.

15. In a cable reeling mechanism for an electric locomotive, the combination of axles, track wheels secured thereto, a frame mounted on the axles, a cable reel rotatably mounted on the frame, a counter-shaft arranged between one of the axles and the reel, power transmitting mechanism interposed between the counter-shaft and the reel, and a train of power transmitting mechanism interposed between the countershaft and the said axle and comprising a positive clutch and a friction clutch, the elements of both of which clutches are normally held in engagement with each other.

16. In a cable reeling mechanism for an electric locomotive, the combination of axles, track wheels secured thereto, a frame mounted on the axles, a reel shaft mounted on the frame, a cable reel carried on the shaft, a countershaft arranged between one of the axles and the reel shaft, power transmitting mechanism between said countershaft and the reel shaft, and a train of power transmitting mechanism between said countershaft and axle comprising a positive clutch and a friction clutch, the elements of the friction clutch being held yieldingly in engagement with each other.

17. In a cable reeling mechanism for an electric locomotive, the combination of axles, track wheels secured thereto, a truck frame mounted on the axles, a reel shaft mounted on the frame, a reel carried by the shaft, a countershaft interposed between the reel shaft and one of the axles, a train of power transmitting devices between the countershaft and the reel shaft, and a train of power transmitting devices between the said axle and the countershaft, the said train being operable independently of all other operative parts and comprising a friction clutch arranged on the countershaft and a positive clutch arranged on the axle.

18. In a cable reeling mechanism for an electric locomotive, the combination of axles, track wheels secured thereto, a truck frame mounted on the axles, a reel shaft mounted on the frame, a reel carried by the shaft, a countershaft interposed between the reel shaft and one of the axles, a train of power transmitting devices between the countershaft and the reel shaft, a train of power transmitting devices interposed between the said axle and the countershaft, the said train being operable independently of all other operative parts and comprising a friction clutch arranged on the countershaft and a positive clutch arranged on the axle, and a lever operable from the electric locomotive for holding one element of the positive clutch in or out of engagement with the other element.

19. In a cable reeling mechanism for an electric locomotive, the combination with a reel shaft, track wheels, a rotating axle secured to the wheels, a reel shaft remote from the axle, and a reel on the shaft, of a countershaft interposed between the axle and the reel shaft and mounted so as to be free to vibrate concentrically about the axis of the axle, power transmitting devices interposed between the countershaft and the reel shaft, and a train of power-transmitting devices interposed between the axle and the countershaft.

20. In a cable reeling mechanism for an electric locomotive, the combination with axles, track wheels, a truck frame mounted on the axles, a reel shaft mounted on the frame, a cable reel carried on the shaft, a countershaft interposed between one of the axles and the reel shaft, a train of power transmitting devices connecting the said countershaft and the reel shaft, a train of power transmitting devices connecting the said axle and the countershaft, and a casing inclosing said last described train of power transmitting devices and supporting the countershaft, the said casing being mounted for oscillation about the said axle.

21. In a cable reeling mechanism for an electric locomotive, the combination of axles, track wheels secured thereto, a truck frame mounted on the axles, a reel shaft mounted on said frame, a cable reel carried by the reel shaft, a countershaft interposed between one of the axles and the reel shaft, a train of power transmitting devices connecting the countershaft with the reel shaft, a train of power transmitting devices interposed between the said axle and the countershaft, and an oil containing casing inclosing said last described train of power transmitting mechanism and supporting the said countershaft, the casing being mounted for oscillation about the said axle.

22. In a cable reeling mechanism for an electric locomotive, the combination of a reel, a reel supporting truck adapted to be propelled by an electric locomotive, said truck comprising a pair of axles freely rotatable independently of all parts other than the reel and associated elements, track wheels secured to the axles and a frame mounted on said axles, a power transmitting device connecting the axles together, and power transmitting devices interposed between one of the axles and the reel.

23. In a cable reeling mechanism for an electric locomotive, the combination of a reel, an independent reel supporting truck adapted to be coupled to and propelled by an electric locomotive, the said truck comprising a frame, an axle for the frame freely rotatable under the influence of track friction independently of all parts other than the reel and associated elements, and track wheels secured to the axle, a train of power transmitting devices comprising a clutch interposed between the axle of the truck and the reel, and means for opening and closing said clutch operable from the operator's position on the electric locomotive.

24. In an electric traction system, the combination of an independent truck adapted to be detachably connected with an electric locomotive to be moved thereby, an electric cable reel suitably mounted upon the truck, power transmitting mechanism for controlling the operation of said reel in the direction to wind up the cable thereon including a uni-directional drive positive clutch, the elements of which are normally held yieldingly in engagement with each other.

In testimony whereof I affix my signature in presence of two witnesses.

FRANK L. SESSIONS.

Witnesses:
CURTIS C. MARSHALL,
W. E. BEBB.